United States Patent [19]

Ihara

[11] Patent Number: 5,020,948
[45] Date of Patent: Jun. 4, 1991

[54] BELT FITTING ENGAGEMENT RAIL
[75] Inventor: Ryoseki Ihara, Aichi, Japan
[73] Assignee: Kabushiki Kaisha Ihara Kogyo, Hoigun, Japan
[21] Appl. No.: 353,333
[22] Filed: May 16, 1989
[30] Foreign Application Priority Data Jun. 17, 1988 [JP] Japan .............................. 63-80457[U]

[51] Int. Cl.⁵ ........................ B65D 61/00; B65D 63/16
[52] U.S. Cl. ...................................... 410/105; 410/108
[58] Field of Search .................. 410/9, 10, 18, 20, 73, 410/76, 81, 89, 96, 104, 105, 106, 115, 116, 130, 132, 108–114, 138, 141; 211/103; 105/422; 24/193, 196, 197, 230.5, 265, 498

[56] References Cited

U.S. PATENT DOCUMENTS

| | | | |
|---|---|---|---|
| 2,984,885 | 5/1961 | Elsner | 410/116 |
| 3,106,377 | 10/1963 | Cotton | 410/116 |
| 3,178,790 | 4/1965 | Cech | 410/115 X |
| 3,405,660 | 10/1968 | Jantzen | 410/104 |
| 3,685,778 | 8/1972 | Berns | 410/116 |
| 3,850,113 | 11/1974 | Sichak | 410/104 |
| 4,877,361 | 10/1989 | DeRosa et al. | 410/116 X |

FOREIGN PATENT DOCUMENTS 587442 11/1959 Canada ................................ 410/105

Primary Examiner—Robert P. Olszewski
Assistant Examiner—Alfred Muratori
Attorney, Agent, or Firm—Wenderoth, Lind & Ponack

[57] ABSTRACT

A belt fitting engagement rail has a rail body for mounting on the inside of a side of a container and having a center portion bulged laterally from the longitudinally extending edge portions. The center portion has a plurality of engagement holes therein spaced along the length of the rail at constant intervals. The engagement holes each have a cross-shape defined by two elongated intersecting portions, one such portion extending longitudinally of the rail and the other extending transversely of the rail. The ends of the transversely extending portions are spaced inwardly of the edge portions to leave a space on the center portion.

1 Claim, 11 Drawing Sheets

BELT FITTING ENGAGEMENT RAIL

FIELD OF THE INVENTION

This invention relates to a belt fitting engagement rail (simply referred to as a rail) mounted to the inside of the side plate of a container for securing a belt fitting attached at the end of a belt used for holding goods loaded in the container so that they are immovable.

DESCRIPTION OF THE PRIOR ART

In recent years there have been developed many container cars with a load carrier in the form of a container. The containers are also often used with aircraft and ships for carrying goods.

To prevent the goods in the container from being damaged, belts are used to fasten them immovably. For this purpose, rails are mounted on the inside of the side plates of the container and a belt fitting attached to the end of the belt is inserted into engagement holes formed in the rail for secure engagement between them.

Figures 14, 15:
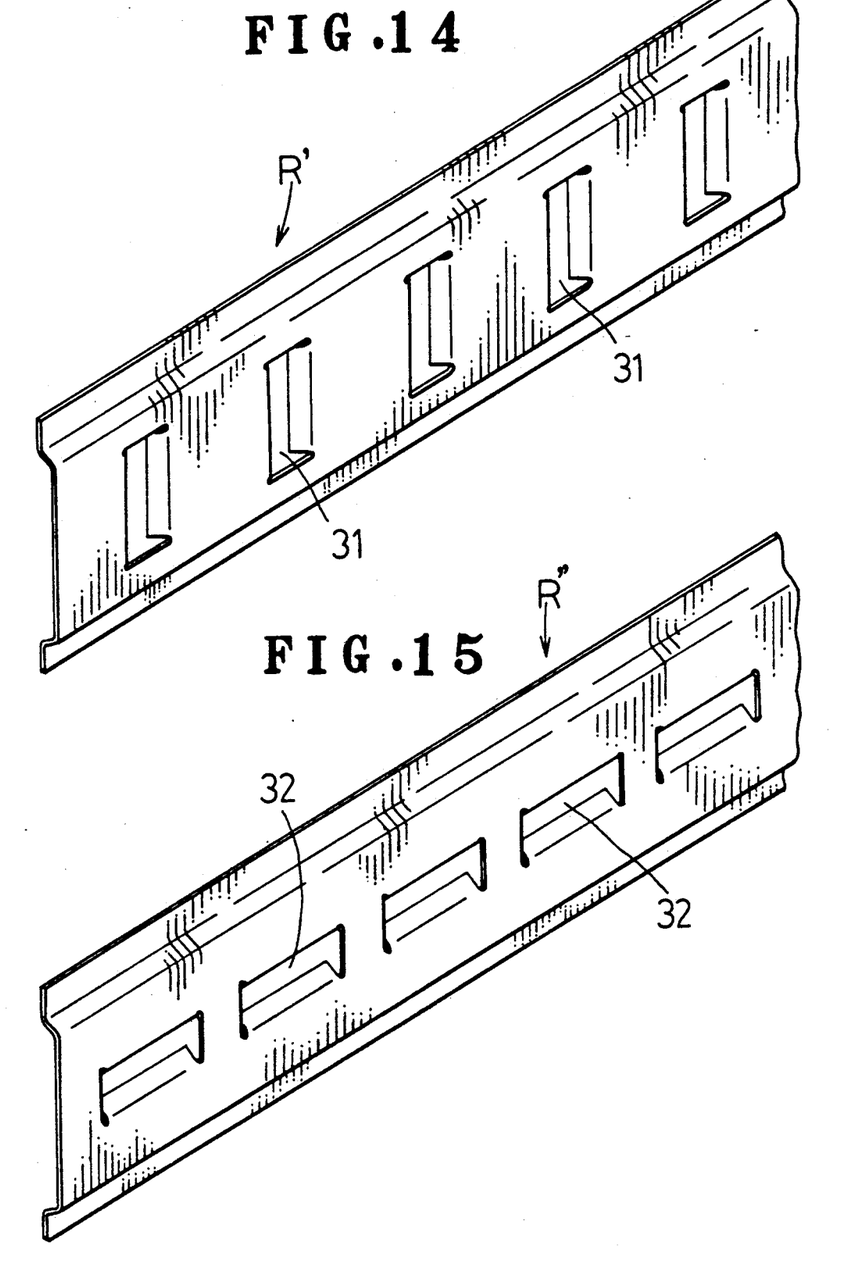
FIGS. 14 and 15 are perspective views of conventional rails R', R"

Conventional rails used for such applications are shown in FIGS. 14 and 15. These rails R', R" have vertically oriented engagement holes 31 and horizontally oriented engagement holes 32 respectively, formed in the rail body 30, extending along the length of the rail at constant intervals.

Figure 16:
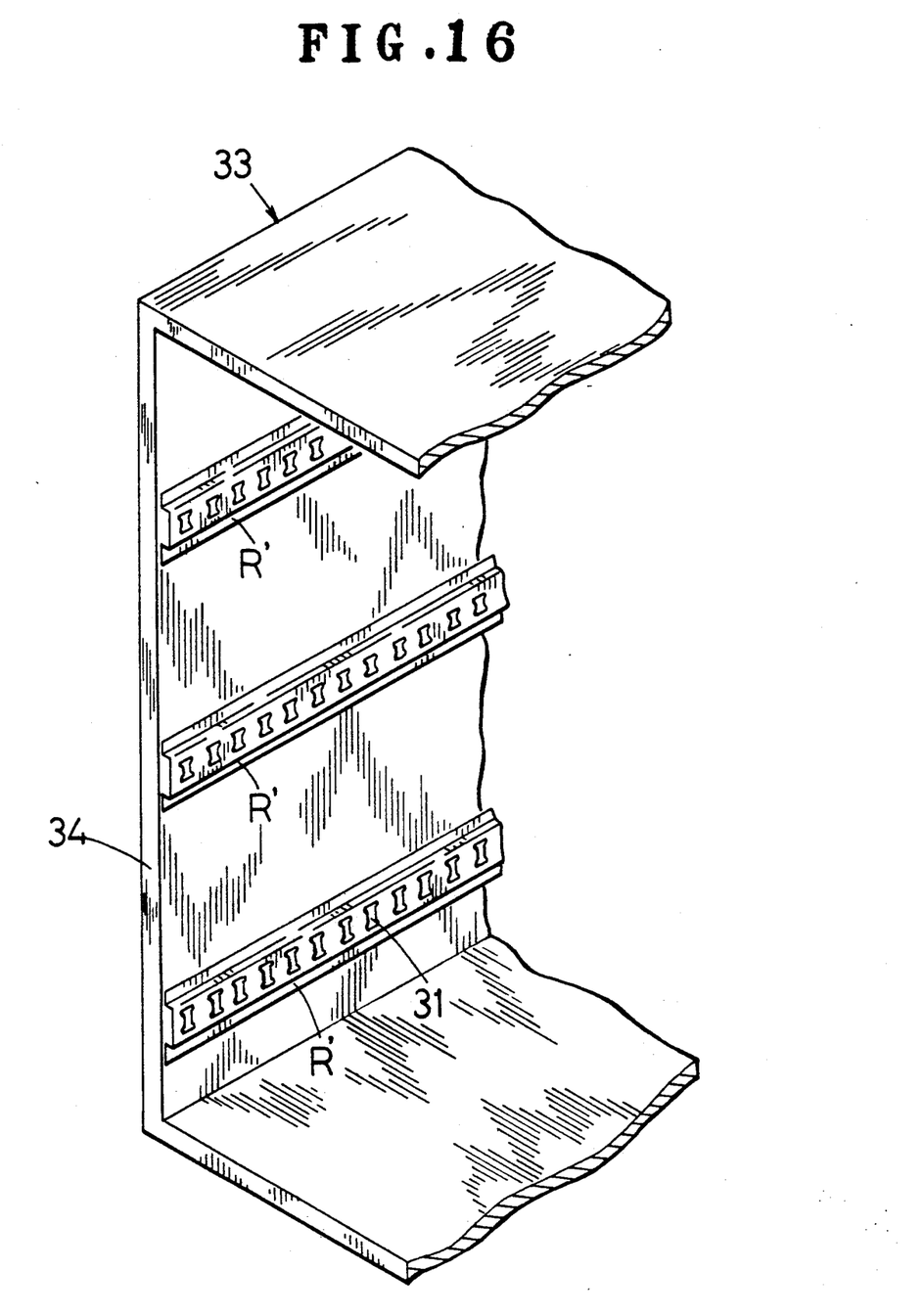
FIG. 16 is a cutaway perspective view of a container 33 equipped with the conventional rail R'.
Figure 19:
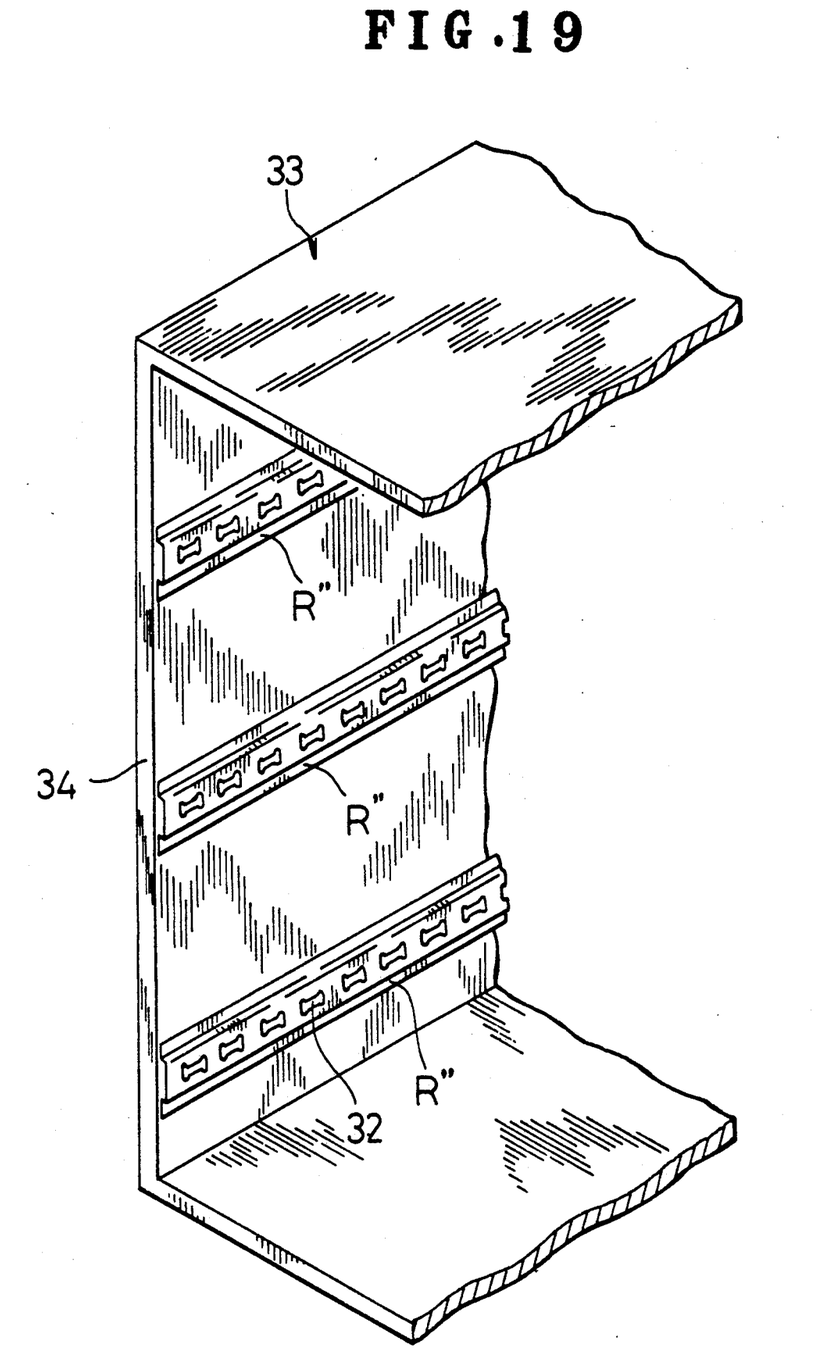
FIG. 19 is a cutaway perspective view of a container 33 equipped with the conventional rail R"

As shown in FIGS. 16 and 19, the rails R', R" are horizontally mounted on the inside of side plates 34 of the container 33.

For the rails R' with vertical engagement holes 31, the belt fittings can only be attached to the rail R' in a vertically oriented attitude. Similarly, for the rails R" with horizontal engagement holes 32, the belt fitting can only be secured to the rails in a horizontal attitude.

Figure 17:
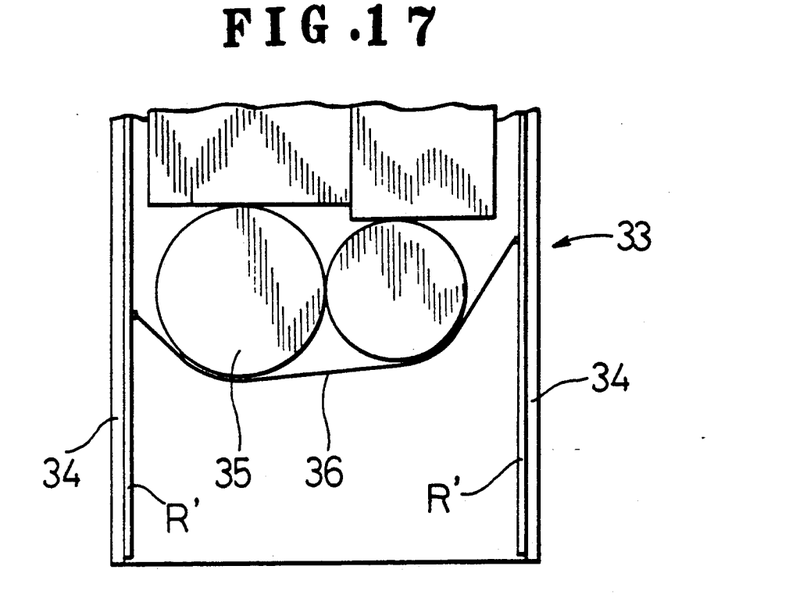
FIGS. 17 and 18 are a plan view and a rear view, respectively, showing goods 35—which are loaded in a container 33 equipped with conventional rails R'—fastened against movement in a horizontal direction by belts 36.
Figure 18:
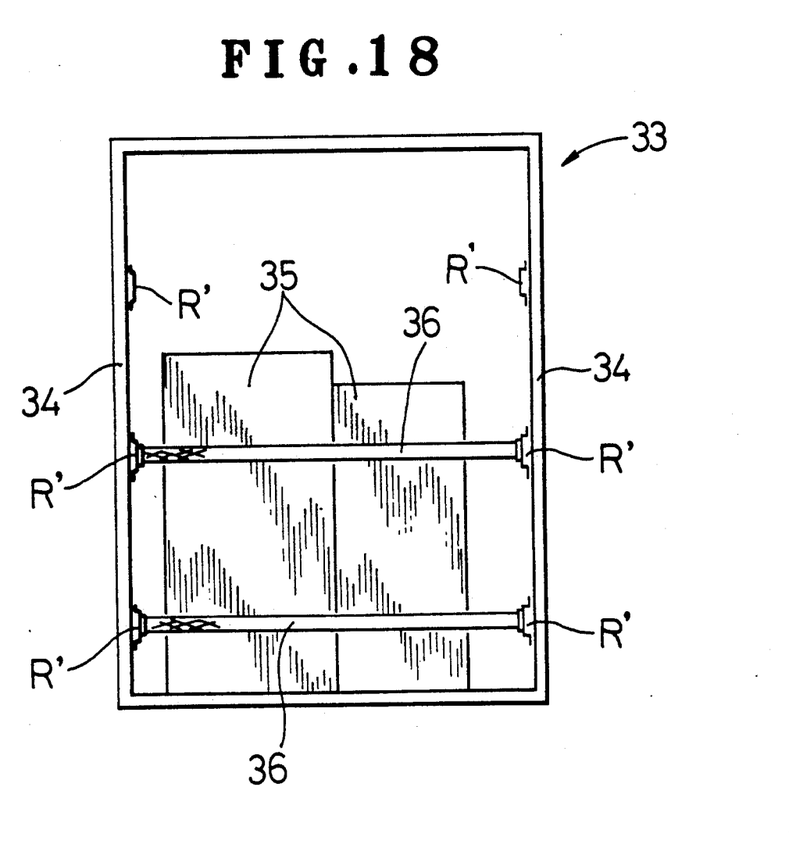

When the rails R' with vertical engagement holes 31 are used, the goods 35 loaded in the container 33 can only be fastened by the belts 36 extending in the horizontal direction, as shown in FIGS. 16 to 18.

Figure 20:
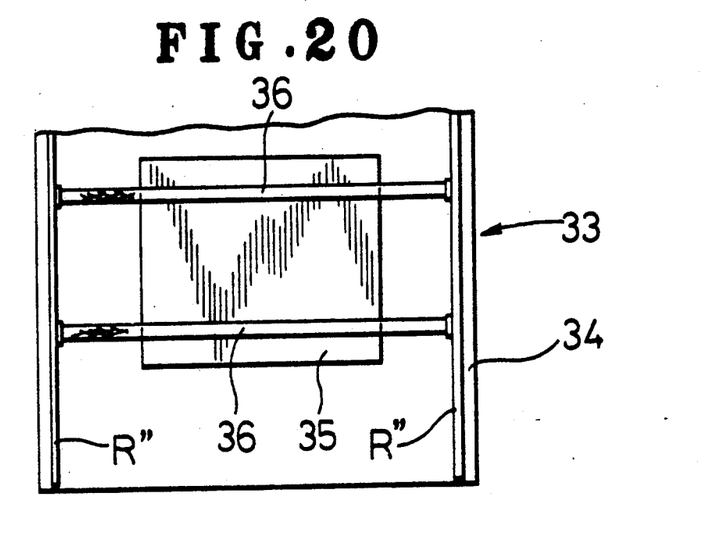
FIGS. 20 and 21 are a plan view and a rear view, respectively, showing goods 35—which are loaded in the container 33 equipped with the conventional rails R"—fastened against movement in a vertical direction by belts 36.
Figure 21:
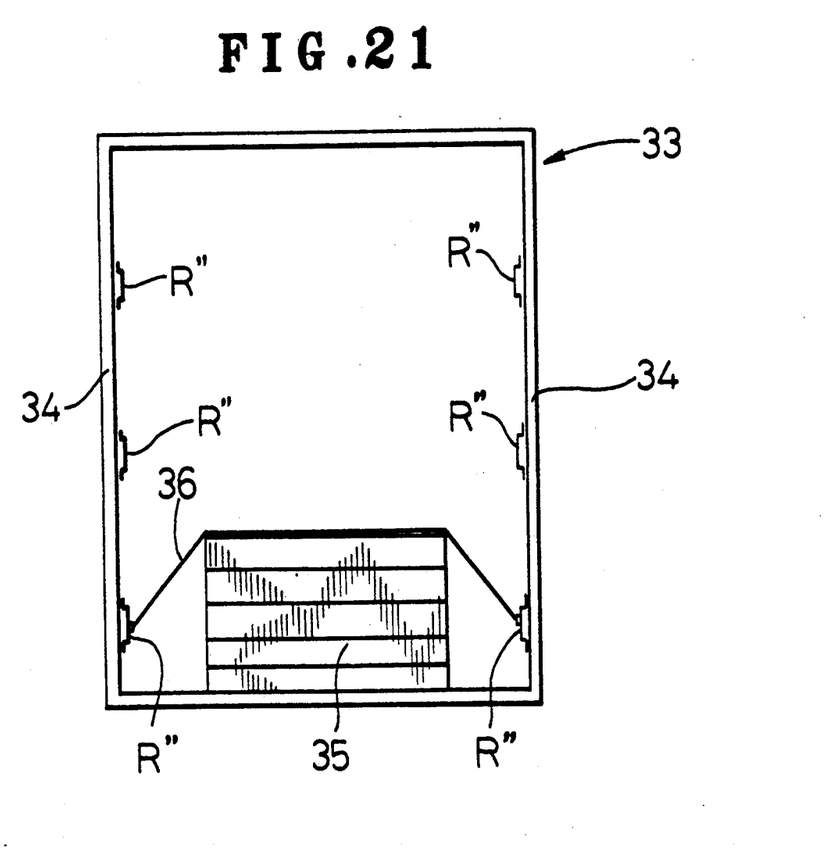

Likewise, when the rails R" with horizontal engagement holes 32 are used, the goods 35 can only be held immovable against movement in the vertical direction as shown in FIGS. 19 through 21.

Furthermore, when it is attempted to hold the goods 35 in the container 33 immovable against movement in the vertical direction by using the belts 36 and the rails R' with vertical engagement holes 31, or when it is attempted to secure the goods 35 against movement in the horizontal direction by using the belts 36 and the rails R" with horizontal engagement holes 32, the belts 36 must be twisted leading to damage to the goods 35.

There are a variety of shapes and sizes of goods 35 which it is desirable to load in the container 33. If it is possible to hold the goods immovable in either vertical or horizontal attitude according to the shape and size of the goods using the same rails, it would be very convenient.

SUMMARY OF THE INVENTION

A belt fitting engagement rail comprises: a rail body mounted to the inside of the side plate of a container; and a large number of engagement holes formed in the rail body arranged along the length of the rail at constant intervals, the engagement holes being adapted to receive and hold a belt fitting attached to the end of a belt for fastening the goods in the container; whereby the engagement holes in the rail body are each formed like a cross so that the belt fitting can be attached to the rail body either in a vertical or a horizontal attitude.

An object of this invention is to make it possible to hold the goods in the container immovable in either vertical or horizontal direction by belts and rails without twisting the belts.

DETAILED DESCRIPTION OF THE EMBODIMENTS

FIGS. 1 through 6 show a rail R1 according to the first embodiment of this invention.

Figures 1, 2:
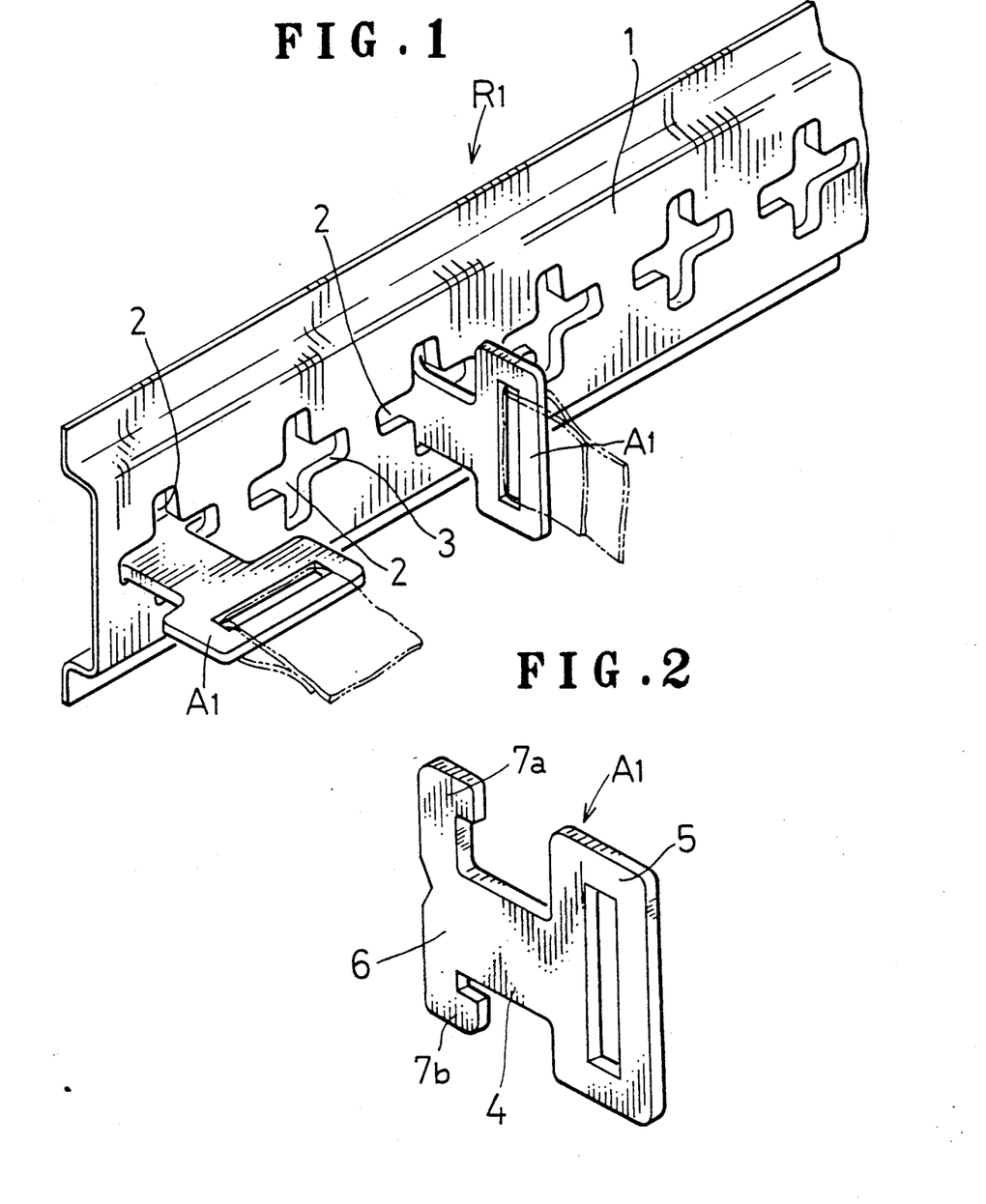
FIG. 1 is a perspective view of a rail R1 attached with belt fittings A1 which are engaged in engagement holes 2 of the rail.
FIG. 2 is a perspective view of the belt fitting A1.
Figures 3, 4, 5:
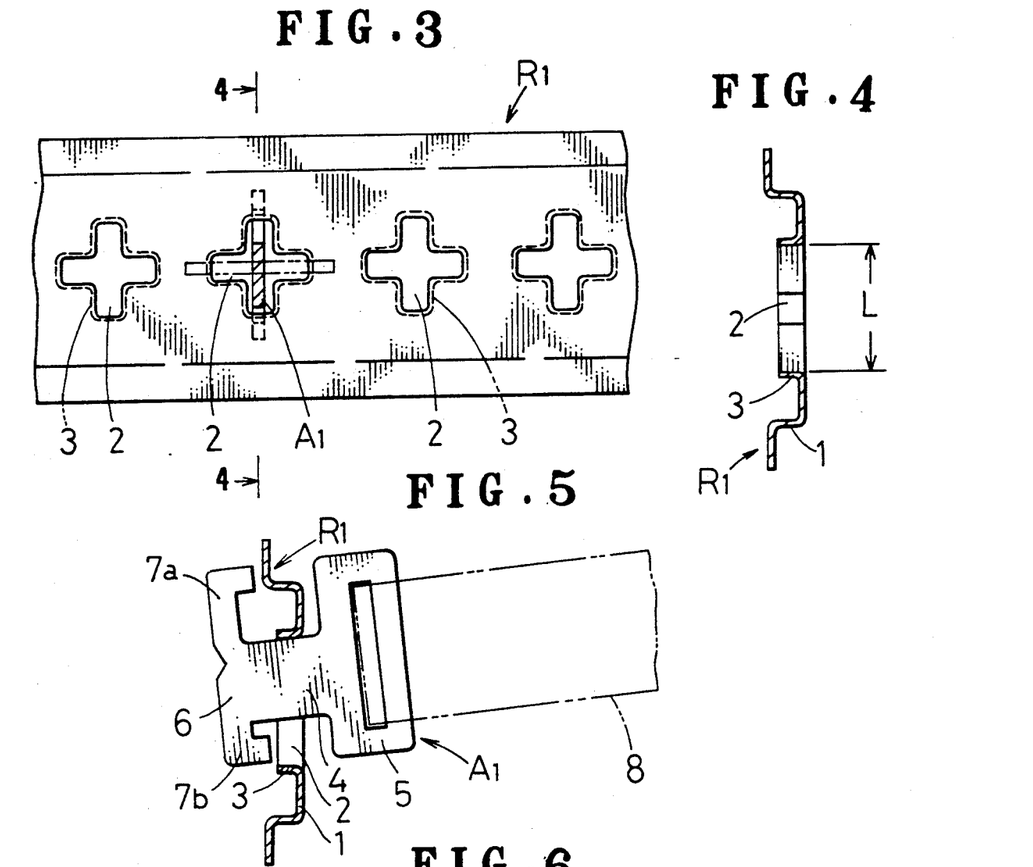
FIG. 3 is a front view of the rail R1.
FIG. 4 is an enlarged lateral cross-sectional view taken along the line 4—4 of FIG. 3.
FIG. 5 is a lateral cross-sectional view showing the belt fitting A1 being attached to the rail R1.

The rail R1 has a rail body 1 formed by bending an elongated metal plate with the center portion bulged laterally from longitudinally extending edge portions and a large number of cross-shaped engagement holes 2 cut in the bulged center and spaced in the longitudinal direction at constant intervals therebetween. The cross-shaped engagement holes 2 having crossed intersecting elongated portions are formed by a burring method, so that an engagement flange 3 is formed along the entire periphery of the engagement hole 2 on the back of the rail body 1. The ends of the elongated portions which extend transversely of the rail body 1 are spaced inwardly of said edge portions so as to leave a space on said center portion.

A belt fitting A1, as shown in FIGS. 2 and 5, has a neck plate 4 formed integral with a body plate 5 and smaller in width than the length L of an elongated portion of the cross engagement hole 2 (see FIG. 4) in the rail body 1. An insertion plate 6, which is wider than the length L of an elongated portion of the engagement hole 2 and adapted to be inserted completely into the engagement hole 2, is formed integral with the front end of the neck plate 4 so that it extends perpendicularly with respect to the neck plate 4. The insertion plate 6 has engagement hooks 7a, 7b formed at each longitudinal end thereof which extend toward the body plate 5 a distance at least equal to the width of flange 3.

The engagement hooks 7a, 7b are not symmetrical with each other with respect to the neck plate 4, and the distance from the neck plate 4 to one engagement hook 7a is larger than the distance to the other engagement hook 7b.

To engage the belt fitting A1 in the cross engagement hole 2 in the rail R1, the following process is carried out, as shown in FIG. 5. That is, the belt fitting A1 is tilted while inserting the engagement hook 7a into the engagement hole 2. With the side of the neck plate 4 in contact with the engagement flange 3, the other engagement hook 7b is inserted into the engagement hole 2. Then, the belt fitting A1 is pulled toward the belt to position the engagement hooks 7a, 7b outside the engagement flange 3, bringing the ends of the engagement hooks 7a, 7b on belt fitting A1 into engagement with the spaces on the center portion of rail R1 which are outward of the ends of the elongated hole portions.

Figure 6:
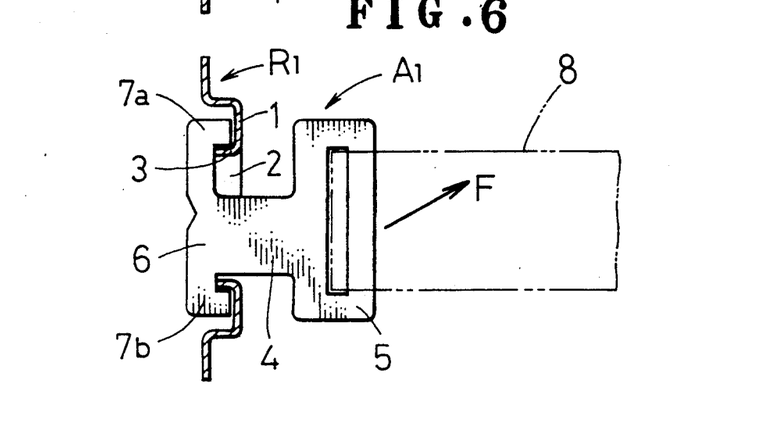
FIG. 6 is a lateral cross-sectional view showing the belt fitting A1 in a fixed or attached position.

As long as the belt 8 which is engaged in the rail R1 is tensed with a specified tension, there is no chance of the belt fitting A1 disengaging from the rail R1. Since the belt fitting A1 is attached to the rail R1 through the engagement between the engagement flange 3 formed around the periphery of the engagement hole 2 in the rail R1 and the engagement hooks 7a, 7b on the belt fitting A1, the belt fitting A1 will not disengage from the rail R1 if, as shown in FIG. 6, the belt fitting A1 receives a force F acting slantwise with respect to the surface of the rail R1.

To remove the belt fitting A1 from the rail R1, the above process is reversed.

Figure 11:
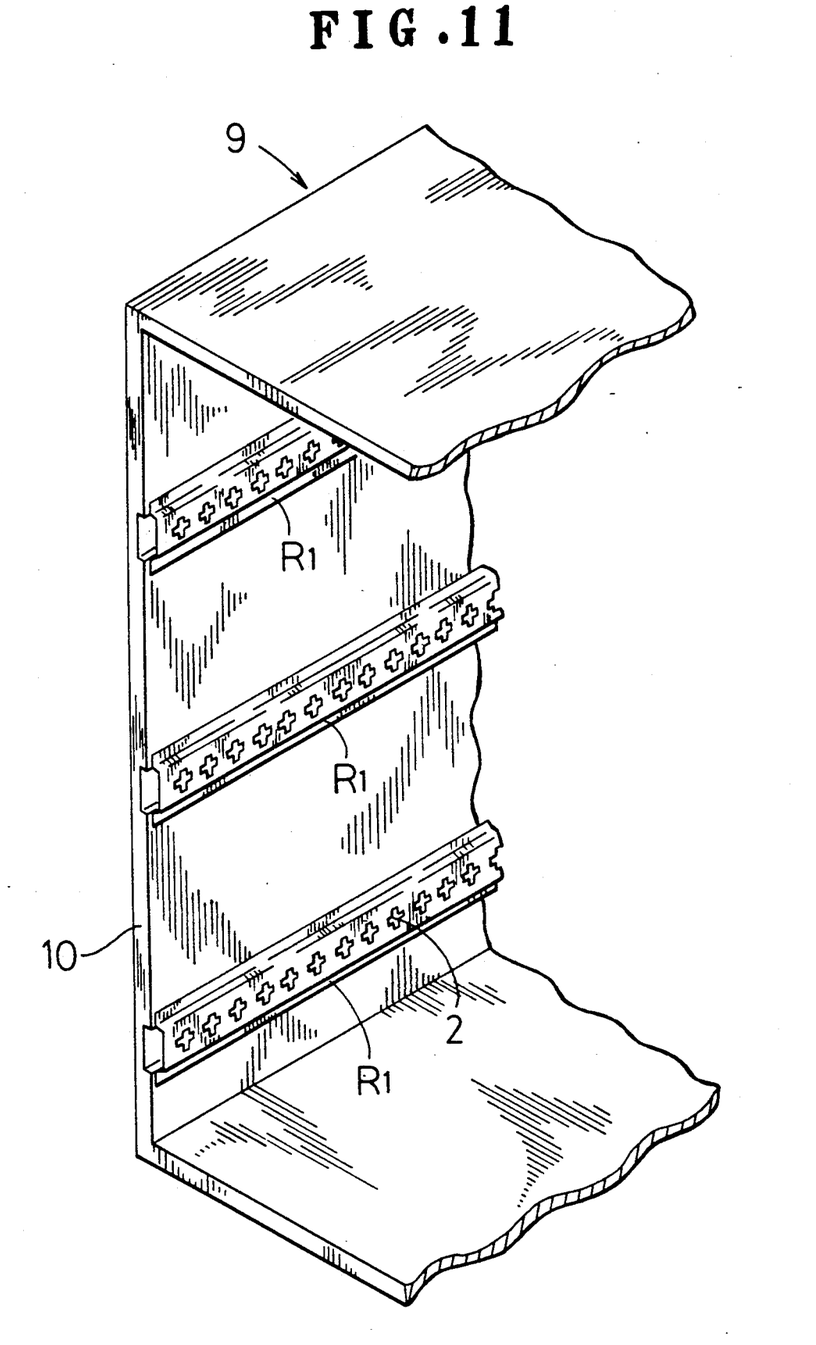
FIG. 11 is a perspective view showing the rails R1 mounted on the inside of a side plate 10 of a container 9.

As shown in FIG. 11, a plurality of rails R1 are horizontally mounted on the inside of the side plate 10 of the container, with specified vertical intervals therebetween.

Figure 12:
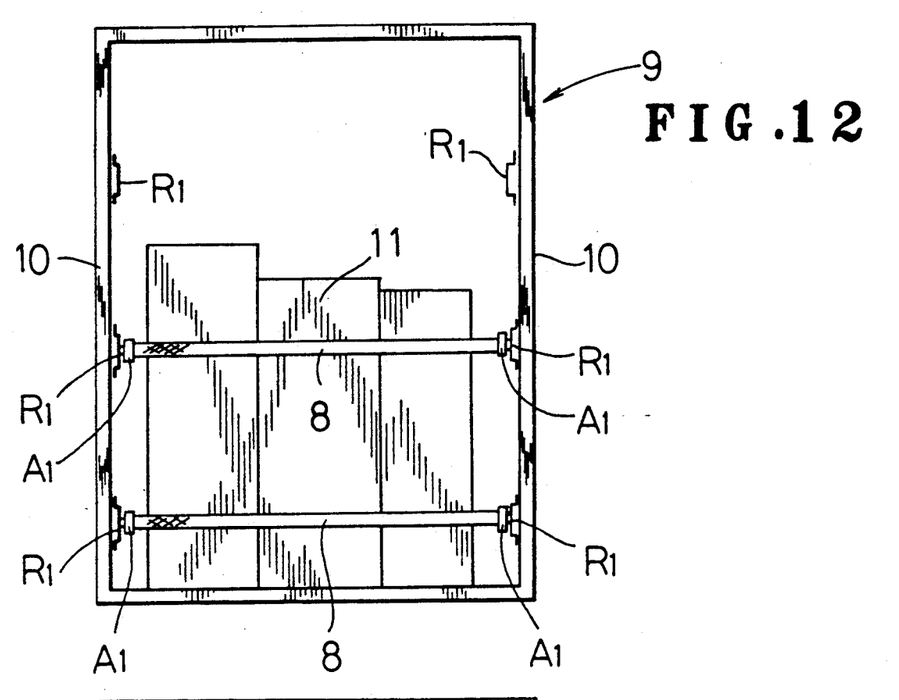
FIGS. 12 and 13 are rear views showing goods 11—which are loaded in the container 9 equipped with the rails R1—fastened by belts 8 in a vertical and horizontal direction, respectively.
Figure 13:
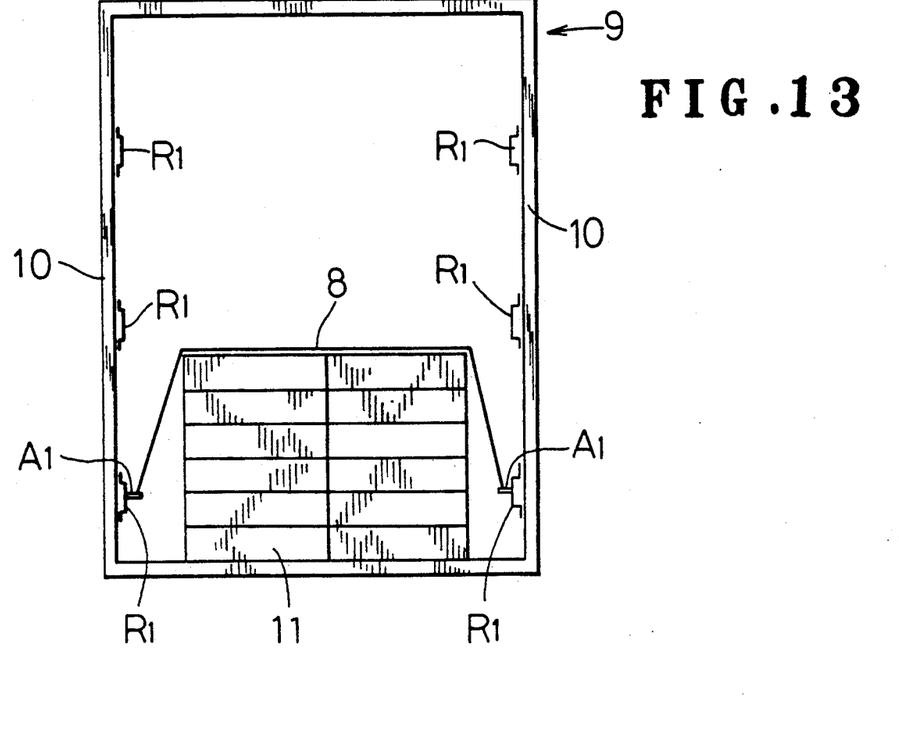

Since an engagement hole 2 is shaped like a cross, it is possible to attach the belt fitting A1 of the belt 8 to the rail R1 by using either of the vertical and horizontal slots of the engagement hole 2, as shown in FIG. 1. This allows the goods 11 loaded in the container 9 to be fastened horizontally, as shown in FIG. 12, or vertically as shown in FIG. 13.

FIGS. 7 through 10 show a rail R2 according to the second embodiment of this invention.

Figures 7, 8:
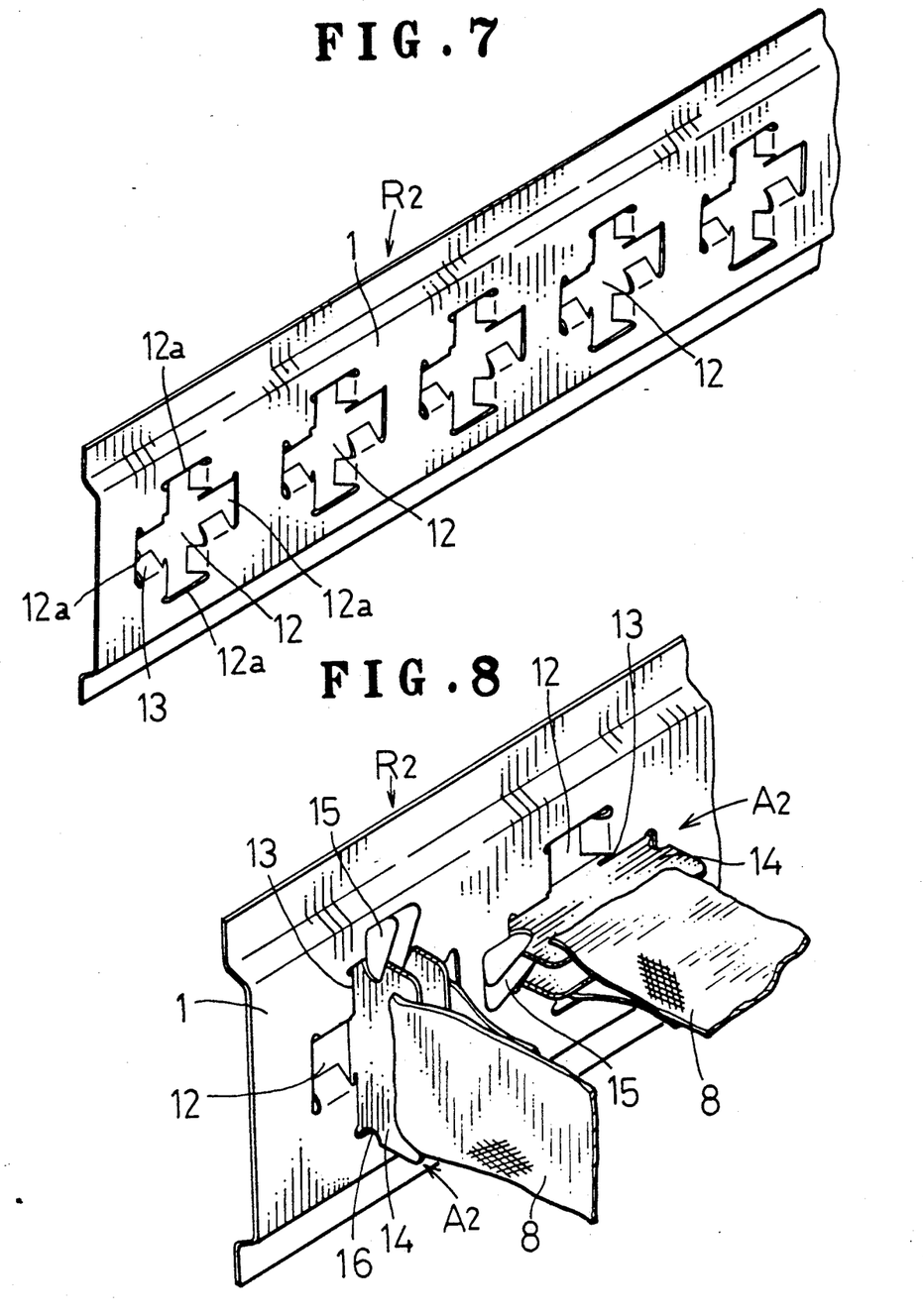
FIG. 7 is a perspective view of a rail R2.
FIG. 8 is a perspective view of the rail R2 attached with belt fittings A2 which are engaged in engagement holes 12.

The rail R2 has a large number of cross-shaped engagement holes 12 having crossed elongated portions cut in a rail body 1, spaced in a longitudinal direction with constant intervals therebetween. Each cross-shaped engagement hole 12 has the ends of its vertical and horizontal elongated portions punched out to form an engagement portions 12a. The vertical and horizontal elongated portions of the engagement hole 12 have guide plates 13 which extend outwardly from the body 1 to guide the belt fitting A2.

Figure 9:
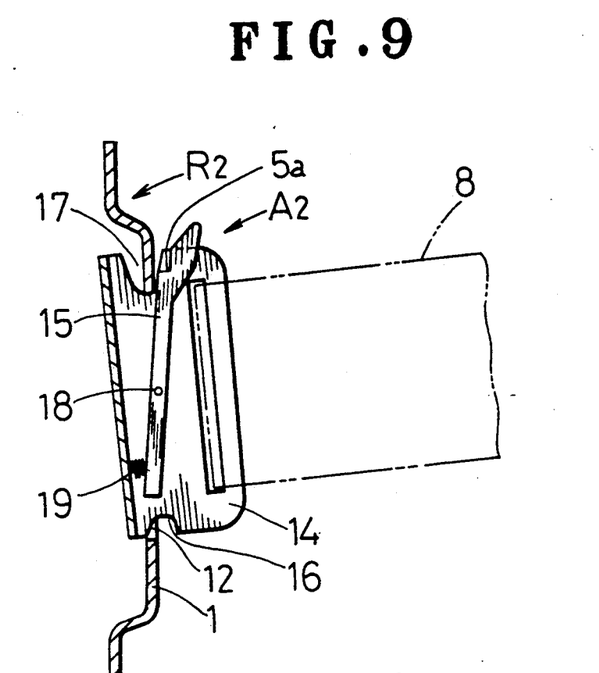
FIG. 9 is a lateral cross-sectional view showing the belt fitting A2 being inserted into the rail R2.
Figure 10:
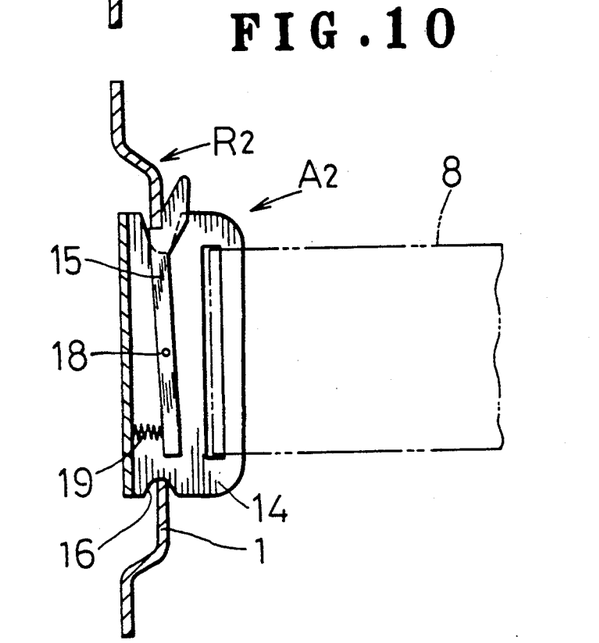
FIG. 10 is a lateral cross-sectional view showing the belt fitting A2 in a fixed or attached position.

As shown in FIGS. 8 through 10, the belt fitting A2 consists of a fitting body 14, which is a metal plate folded in a U-shape, and a lock lever 15 disposed inside the body 14. The fitting body 14 is formed with a small engagement notch 16 at one end and a large engagement notch 17 at the other end. The lock lever 15 is pivotably mounted on the fitting body 14 on a pin 18. A locking notch 15a is provided on one end of lock lever 15 adjacent large engagement notch 17. A compression spring 19 is installed between the fitting body 14 and the other end of the lock lever 15.

As shown in FIG. 9, the end of lock lever 15 with locking notch 15a therein is pulled away from the notch 17 and spring 19 is compressed, and the fitting body 14 is put in the engagement hole 12 so that the periphery of the engagement hole 12 in the rail R2 is received in the small and large engagement notches 16, 17 of the fitting body 14. Then, as the lock lever 15 is released, the recovering force of the compression spring 19 causes the locking notch 15a of the lock lever 15 to engage with the periphery of the engagement portion 12a of the hole 12 and to urge small engagement notch 16 into engagement with the periphery of engagement portion 12a, as shown in FIG. 10.

FIG. 9 and FIG. 10 show the case where the belt fitting A2 is attached to the rail R2 in a vertical attitude. It is also possible to attach the belt fitting A2 to the rail R2 in a horizontal attitude as shown at the left in FIG. 8.

In this way, the belt fitting A2 can be attached to the rail body 1 either in the vertical or horizontal attitude, so that when the rail R2 is mounted on the inside of the side plate 10 of the container 9, the goods 11 loaded in the container 9 can be fastened so as to be immovable by the belts and the rail R2 either in a vertical or horizontal direction.

The provision of the rail according to this invention on the inside of the side plate of the container makes it possible to hold the goods loaded in the container immovable by the belts and rail either in a vertical or horizontal direction, without twisting the belts.

As a result, the goods can be effectively fastened by belts according to the shape and size of the goods loaded in the container.

I claim:
1. A belt fitting engagement rail, comprising:
   A rail body for mounting on the inside of a side of a container and having longitudinally extending edge portions and a center portion bulged laterally from said longitudinally extending edge portions; and
   said center portion having a plurality of engagement holes therein spaced along the length of said rail at constant intervals, said engagement holes having a cross-shape defined by two elongated intersecting portions, one extending longitudinally of said rail and the other extending transversely of said rail, the ends of the transversely extending portion being spaced inwardly of said edge portions to leave a space on said center portion; and
   flange means around the edge of the entire periphery of each said engagement holes, said flange means extending in a direction opposite from the direction in which said center portion is bulged from said edge portions.

* * * * *